United States Patent [19]

Cleveland, III

[11] Patent Number: 5,458,028
[45] Date of Patent: Oct. 17, 1995

[54] SOCKET WRENCH DEVICE

[75] Inventor: Orison Cleveland, III, Palm Bay, Fla.

[73] Assignee: Cleveland Tool Corporation, Palm Bay, Fla.

[21] Appl. No.: 241,333

[22] Filed: May 11, 1994

[51] Int. Cl.⁶ .................................. B25G 1/02; F16D 3/52
[52] U.S. Cl. ......................... 81/177.75; 464/57; 464/119; 464/136; 81/177.6
[58] Field of Search ............................. 81/177.75, 177.6; 403/57, 58, 114, 122, 129, 132, 144; 464/54, 51, 57, 61, 69, 106, 114–119, 136, 174

[56] References Cited

U.S. PATENT DOCUMENTS

| 1,102,863 | 7/1914 | Bojas. | |
|---|---|---|---|
| 1,324,898 | 12/1919 | Hopcraft. | |
| 1,485,036 | 2/1924 | Kingsley | 464/57 |
| 2,196,297 | 4/1940 | Gagne | 81/177.75 X |
| 2,327,821 | 8/1943 | Rueb. | |
| 2,499,569 | 3/1950 | Cooley. | |
| 3,122,901 | 3/1964 | Thompson. | |
| 3,522,713 | 8/1970 | Hayes. | |
| 4,065,941 | 1/1978 | Aoki. | |
| 4,075,913 | 2/1978 | Tye. | |
| 4,721,493 | 1/1988 | Lane. | |

*Primary Examiner*—D. S. Meislin
*Attorney, Agent, or Firm*—Nies, Kurz, Bergert & Tamburro

[57] ABSTRACT

A universal joint device for interconnecting the handle portion and socket portion of a socket wrench is disclosed. The universal joint device is constructed with grooves for receiving the upper and lower ends of a coil spring which maintains the universal joint in alignment during both tension and compression. The universal joint device is also provided with recessed apertures for receiving washers or similar adjustment devices to allow the device to be customized for additional rigidity or flexibility.

7 Claims, 2 Drawing Sheets

SOCKET WRENCH DEVICE

BACKGROUND AND SUMMARY OF THE INVENTION

The present invention relates to a spring loaded tool system which is applicable to a universal joint for socket wrenches. More particularly, the present invention relates to a double acting, spring loaded variable tension self-aligning universal joint adaptor system for socket wrenches.

Previous universal joint devices are described, for example, in the following U.S. Pat. Nos.: 1,102,863 to Bojas; 1,324,898 to Hopcraft; 2,327,821 to Rueb; 2,499,569 to Cooley; 3,122,901 to Thompson; 3,522,713 to Hayes; 4,065,941 to Aoki; 4,075,913 to Tye; and 4,721,493 to Lane.

By the present invention, there is provided an improved universal joint device which can be customized in the field by the user, by simply compressing and bending the unit and pushing out the pins. Once this is done, split washers or similar adjustment devices may be installed in recesses which are provided in the universal joint device. In addition, the spring may be removed and replaced with a longer unit for more flexibility. These customizing features allow the user to adjust the unit to suit each individual application, or to replace worn or damaged parts.

These adjustability features allow the user to set the unit or system after customizing it, so that each setting will not continue beyond what is desired, and can only go back towards the setting or to the centered position, depending on the components programmed in. Continuing past the initial setting has been the main failing of other devices which employ U-joints for wrenches. It is this failing which led to the development of the present invention in the form of a double acting, spring loaded variable tension self-aligning universal joint adaptor system for socket wrenches.

Thus, according to the present invention, there is provided an improved socket wrench wherein a handle portion is connected to a socket portion by an improved universal joint. Both portions have forked end members with diametrically opposed arms and bore holes in the arms. A spring is mounted in grooves in both the handle portion and the socket portion and encircles the intervening U-joint.

The handle portion and the socket portion both have spring retaining grooves which have inner and outer lips and which provide for easy attachment of the spring to the portions. These grooves allow the wrench to hold the spring in alignment with its task object during both tension and compression, without having to re-apply the wrench to the object several times to accomplish a desired task. In one embodiment of the invention, one or more voids are provided in the lips and grooves which retain the spring, thus facilitating removal and replacement of the spring.

The U-joint of the present invention is generally typical of universal joints in the field. It includes a swivel block, with a pair of axially perpendicular holes bored therethrough, with the block being pivotally connected to the handle portion and the socket portion by pins which pass through the bore holes in the arms of the forked end members of each portion and through the pair of axially perpendicular holes, with the pins being a press fit in the holes in the swivel block. In one embodiment of the invention, the swivel block is provided with at least one recessed aperture per hole which is concentric to and of greater diameter than the hole it aligns with on the swivel block. Each aperture allows for insertion of one or more washers so that the socket wrench may be custom set and thereby maintain a desired angle depending upon its application. Additionally, this feature allows the user to easily replace worn or damaged parts.

The broad adaptability of this tool is in itself made possible by the annular spring retaining grooves, which contribute to the unique double action tension and compression use of the concentric aligning spring.

The two-way or double acting dual diameter spring aligned universal joint eliminates time consuming re-applying of the wrench into the small inaccessible spaces in which the ordinary universal joint wrenches are subject to use.

It is an object of the present invention to provide a universal joint for wrenches possessing the ability to hold the wrench in alignment with the fastener by pushing the wrench onto a nearby fitting so that the joint operates in a conventional manner with no interference from the concentric spring.

It is another object of the present invention to provide a universal joint construction which operates properly without interference and with sufficient force to hold a heavy socket or extension in alignment. To do so, the concentric spring must have high strength and also be highly compliant. A heavy spring thus is generally not suitable. A lighter strength spring working in compression on one side and tension on the other side can impart the aligning forces desired. The smaller spring coils also allow greater flexibility.

DESCRIPTION OF THE PREFERRED EMBODIMENTS

Figure 1:
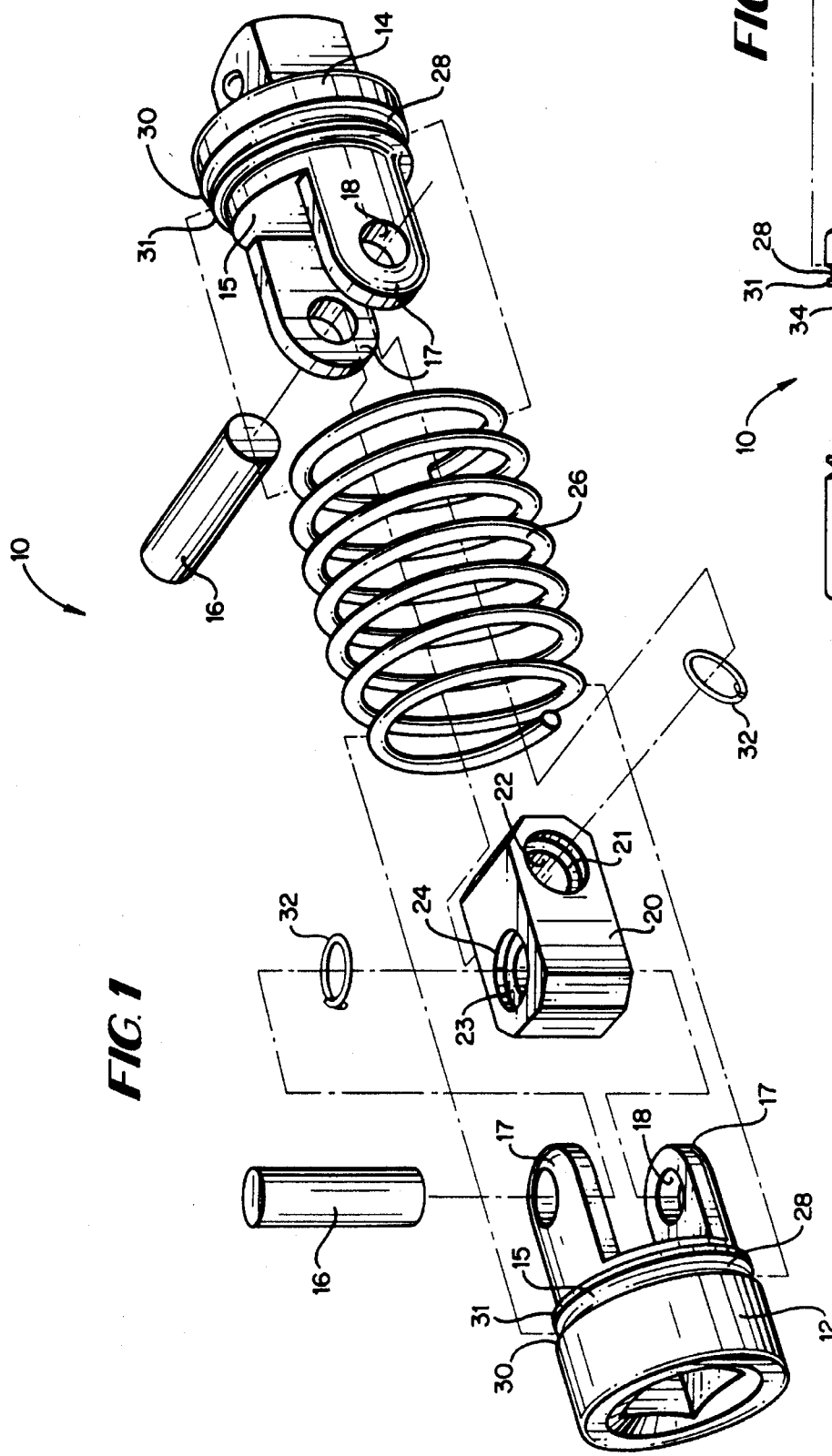
FIG. 1 is an exploded perspective view of the socket wrench device of the present invention.

In the embodiment of the invention as shown in FIGS. 1 through 4, there is provided a universal joint device 10 for use with a socket wrench that allows the user to custom set the socket wrench for greater ease of use. The universal joint has two end portions, a handle portion 12 and a socket portion 14. Each portion 12, 14 has a bifurcated or forked end yoke member 15 with a pair of arms 17. Each pair of arms 17 contains a bore hole 18. A swivel block 20 with a pair of axially perpendicular holes 22, 24 pivotally connects the handle and socket portions 12, 14 as it is inserted between both pairs of arms 17 of the forked end members 15 and maintained there by pins 16 which are press fitted through the bore holes 18 and the corresponding axially perpendicular holes 22, 24. In one embodiment of the invention, recessed apertures 21, 23 are located on the surface of the swivel block 20 and surrounding the holes 22, 24 of the swivel block 20, as shown in FIG. 1, to allow one or more washers 32 to be inserted for the purpose of providing additional rigidity for the device 10. In a specific embodiment of the invention, the recessed apertures 21, 23 have a diameter of 0.280 inches with a depth of 0.04 inches and washers 32 have a diameter of 0.266 inches with a wire diameter of 0.031 inch (1/32 inch). In one embodiment of the invention, round wire lock washers 32 are employed.

A spring 26 surrounds the swivel block 20 and handle and socket portions 12 and 14 and is received by spring retaining grooves 28 on both portions 12,14 such that the device 10 can hold the spring 26 in place during both tension and compression. The spring 26 must be constructed of a material having sufficient strength to hold the tool attachments and fastener sufficiently rigid so as not to bend easily past the desired position. Should this occur, the spring 26 will be of sufficient strength to return the tool attachments to approximately the center position to be applied again to the fastener. This procedure can be repeated as many times as is necessary to apply the tool attachments to the fastener without the use of both hands of the operator, thereby eliminating frustration usually associated with universal joint type operations. In one embodiment of the invention, the spring 26 is made of SAE 1080 high carbon steel.

The spring 26 employed in the present invention is of a dual diameter coil construction, with the end coils 33 which are received in grooves 28 being of reduced diameter as compared to the main central portion of the spring 26. In a specific embodiment of the invention, the inside diameter of the main central portion of the spring 26 ranges from 0.724 to 0.740 inches, the inside diameter of the end coils 33 of the spring 26 is 0.665 inches, the free length of the spring 26 ranges from 1.205 inches to 1.245 inches, the installed length of the spring 26 is 1.120 inches, and the wire diameter of the spring 26 is 0.063 inch (1/16 inch). The desired spring free length will compress approximately 5/64 to 1/8 inch down to the desired installed length.

Figure 4:
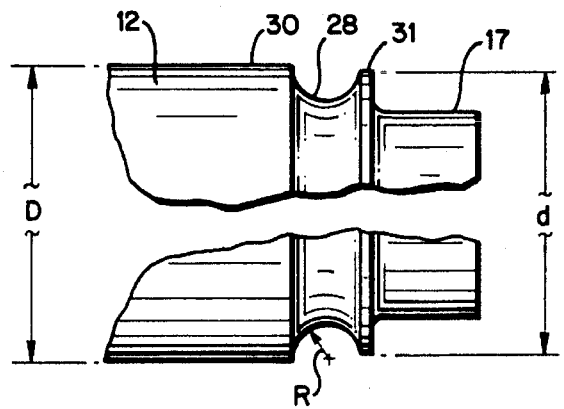
FIG. 4 is a side elevation view with cut-away portion of the socket wrench device of FIG. 3, showing an enlarged view of the handle portion on the left side of FIG. 3.

The spring retaining grooves 28 are provided with outer 30 and inner 31 lips or shoulders which define the inner and outer boundaries of the grooves 28 within the socket and handle portions, 12, 14, respectively. In one embodiment of the invention, the inner lips 31 formed by the spring retaining grooves 28 are of a smaller diameter than the outer lips 30. This helps the outer lips 30 to provide compression resistance and to retain the spring 26 and shield it from impact while allowing the spring 26 to be easily installed over the inner lips 31. Also, the inner lips 31 are just large enough to retain the spring 26 and just wide enough to avoid being dented by the spring 26. In one embodiment, the inner lips 31 have a width of 0.02 inches. With reference to FIG. 4, in a specific embodiment of the present invention, the inner lips 31 have a diameter "d" of 0.735 inches, the outer lips 30 have a diameter "D" of 0.750 inches, and each groove is formed with a radius "R" of 0.035 inches and a diameter extending through the groove 28 of 0.665 inches.

In the operation of the universal joint device 10 of the present invention, the existence of a washer 32 located within at least one recessed aperture 21, 23 surrounding each hole 22, 24 in the swivel block 20 allows the device 10 to be custom set to a determined angle and allows for easy replacement of parts. The spring 26, removably mounted in the grooves 28, serves to hold the ends 12, 14 yieldably in coaxially aligned relation in both tension and compression so that a user can hold the wrench in alignment with a nut or bolt, for example, without having to re-apply the wrench to the object several times. The angle of the socket portion 14 as shown in phantom lines in FIG. 2 will be typical of any universal joint in the field. The self-centering nature of the present invention allows the user to miss or overshoot the target fastener until he hits it, without removing and resetting the tool.

Figure 5:
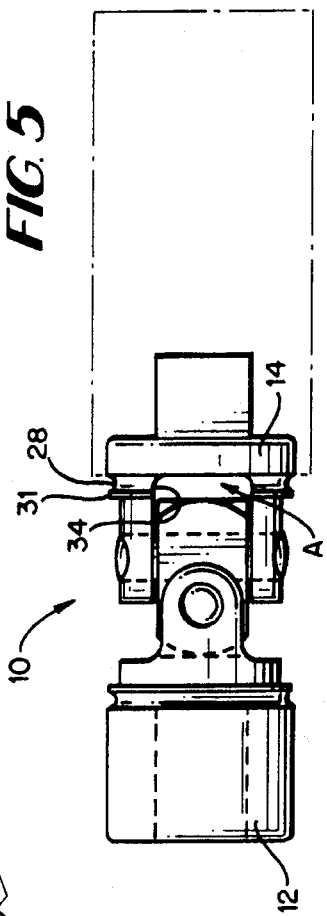
FIG. 5 is a side elevation of a portion of an alternative embodiment of the socket wrench device of the present invention.
Figure 2:
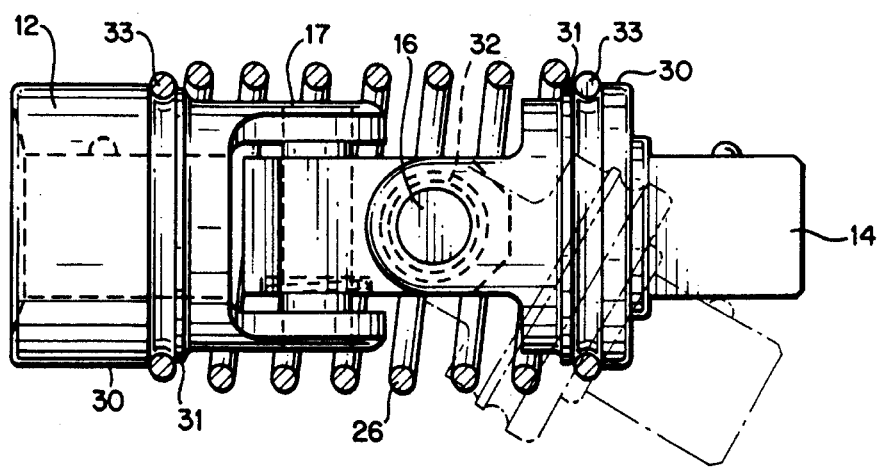
FIG. 2 is a front elevation view of the socket wrench device of FIG. 1, with dashed lines showing approximate permissible rotation of the device.
Figure 3:
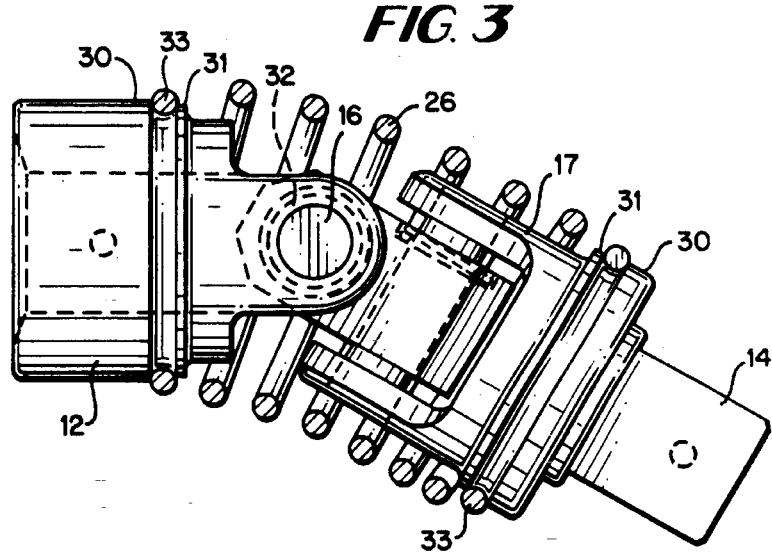
FIG. 3 is a side elevation view of the socket wrench device of FIG. 1, with the device being pivoted into a set position.

In the embodiment as shown in FIG. 5 double voids 34 are provided in the inner lip 31 and groove 38 at one end of the device 10. These voids 34 may be obtained by machining the cavity shown at "A" in the socket end portion 14. The purpose of the voids 34 is to create a gap between the spring 26 and the underlying lip 31 or groove 28 and thus facilitate removal and replacement of the spring 26. It is within the scope of the invention to have one or more voids 34 in both the handle portion 12 and the socket portion 14 of the device 10, although such treatment at one end is generally sufficient. It is also within the scope of the invention to provide a void in the lip 31 or groove 28 by other methods, such as by machining away one or more portions of the outer surfaces of the lip 31 or groove 28 at either end of the device 10.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by Letters Patent is:

1. A universal joint device for a socket wrench, comprising:

a handle portion having a forked end member and a first spring retaining groove;

a socket portion having a forked end member and a second spring retaining groove;

an intermediate swivel block;

means for providing a first pivotal connection of the forked end member of said handle portion to said swivel block, and means for providing a second pivotal connection of the forked end member of said socket portion to said swivel block, such that the axes of said first and second pivotal connections are at substantially right angles to each other; and a spring concentric with and encircling said swivel block, said spring being mounted in said handle portion and said socket portion by engagement with said first and second spring retaining grooves so as to retain said spring in both tension and compression, said spring being a coil spring having the end coil on each end thereof being of reduced diameter as compared to the main central portion of the spring, and with a single end coil being mounted in each of said first and second spring retaining grooves, said spring retaining grooves being constructed with inner and outer lips or shoulders which define the inner and outer boundaries of said grooves within the respective handle portion or socket portion, said inner and outer lips or shoulders being perpendicular to the longitudinal axis of said device in the unflexed position of said device.

2. The universal joint device of claim 1 wherein the outer lip or shoulder of said at least one groove is of larger diameter than the inner lip or shoulder.

3. The universal joint device of claim 1 wherein said forked end members of said handle portion and said socket portion are each provided with a pair of arms having bore holes, wherein said swivel block is provided with a pair of axially perpendicular holes bored therethrough, and wherein said first and second pivotal connection means each includes a pin for pivotally connecting the respective handle portion or socket portion with said swivel block through said bore holes in said pair of arms of said forked end member and through one of the holes in said swivel block.

4. The universal joint device of claim 3 wherein said swivel block contains at least one recessed aperture which is concentric with and of greater diameter than at least one of the holes in said swivel block.

5. The universal joint device of claim 4 wherein at least one washer is removably mounted within said at least one recessed aperture of said swivel block.

6. The universal joint device of claim 1 wherein at least one of the lips or shoulders has an outer surface and wherein said outer surface has a void which creates a gap between the spring and said at least one lip or shoulder.

7. The universal joint device of claim 1 wherein at least one of the handle portion and socket portion has a cavity extending into the respective groove to provide a gap between said spring and said respective groove.

* * * * *